United States Patent
Mahn

(10) Patent No.: US 9,890,289 B2
(45) Date of Patent: *Feb. 13, 2018

(54) LOW REFLECTANCE CHEMICAL AGENT RESISTANT COATING COMPOSITIONS

(71) Applicant: THE SHERWIN-WILLIAMS COMPANY, Cleveland, OH (US)

(72) Inventor: Edmund J Mahn, Grove City, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 329 days.

This patent is subject to a terminal disclaimer.

(21) Appl. No.: 14/603,623

(22) Filed: Jan. 23, 2015

(65) Prior Publication Data

US 2015/0259541 A1    Sep. 17, 2015

Related U.S. Application Data

(62) Division of application No. 12/544,510, filed on Aug. 20, 2009, now Pat. No. 9,012,556.

(60) Provisional application No. 61/090,446, filed on Aug. 20, 2008.

(51) Int. Cl.
| | |
|---|---|
| *C09D 5/03* | (2006.01) |
| *C09D 133/14* | (2006.01) |
| *C09D 7/12* | (2006.01) |
| *C08K 3/34* | (2006.01) |
| *C09D 133/10* | (2006.01) |
| *C09D 133/08* | (2006.01) |
| *C09D 133/06* | (2006.01) |
| *C08K 3/00* | (2006.01) |
| *C08K 5/5415* | (2006.01) |
| *C08K 5/00* | (2006.01) |
| *C09D 11/02* | (2014.01) |
| *C09D 11/08* | (2006.01) |
| *C09D 11/10* | (2014.01) |

(52) U.S. Cl.
CPC ............ *C09D 5/035* (2013.01); *C08K 3/0033* (2013.01); *C08K 3/34* (2013.01); *C09D 5/03* (2013.01); *C09D 5/032* (2013.01); *C09D 7/1216* (2013.01); *C09D 133/066* (2013.01); *C09D 133/08* (2013.01); *C09D 133/10* (2013.01); *C09D 133/14* (2013.01); *C08K 5/0025* (2013.01); *C08K 5/5415* (2013.01); *C08L 2312/00* (2013.01); *C09D 11/02* (2013.01); *C09D 11/08* (2013.01); *C09D 11/10* (2013.01)

(58) Field of Classification Search
CPC .......... C09D 5/03; C09D 5/032; C09D 11/02; C09D 11/08; C09D 11/10; C08L 33/066
See application file for complete search history.

(56) References Cited

U.S. PATENT DOCUMENTS

| | | | | |
|---|---|---|---|---|
| 4,565,730 A | * | 1/1986 | Poth .................. | C08G 18/6229 427/385.5 |
| 5,098,952 A | * | 3/1992 | Blasko ............... | C08G 18/6229 525/123 |
| 5,098,956 A | * | 3/1992 | Blasko ............... | C08G 18/6229 525/123 |

* cited by examiner

*Primary Examiner* — Melissa A Rioja
(74) *Attorney, Agent, or Firm* — Vivien Y. Tsang

(57) ABSTRACT

A powder coating composition comprising:
(a) a first acrylic powder resin having a hydroxyl value of at least about 180;
(b) a second acrylic powder resin having a hydroxyl value less than about 45;
(c) a crosslinker reactive with the hydroxyl functional acrylic resins; and
(d) wollastonite.

2 Claims, No Drawings

LOW REFLECTANCE CHEMICAL AGENT RESISTANT COATING COMPOSITIONS

CROSS REFERENCE TO RELATED APPLICATION

This application is a Divisional of U.S. application Ser. No. 12/544,510 filed Aug. 20, 2009, now U.S. Pat. No. 9,012,556 B1 issued on Apr. 21, 2015, which claims priority to U.S. Provisional Ser. No. 61/090,446 filed on Aug. 20, 2008, the entirety of both of which are hereby incorporated by reference.

This invention relates to powder coating compositions having excellent chemical resistance and extremely low gloss. These properties are obtained by the selection of a combination of hydroxy functional acrylic powder resins having different hydroxyl values and by the use of wollastonite as a flattening pigment.

Very low gloss powder coatings are desirable for a variety of uses including automotive interior parts, wheel rims, bumpers, firearms, and military applications and other articles where low reflectance is desired. A particular requirement of some military applications involves resistance to penetration by chemical warfare agents according to military specifications such as MIL-C-46168. For some military and commercial applications it is useful to provide a coating composition which when applied to a substrate and cured will have a 60° gloss less than 1 and an 85° gloss less than 7. Although a number of prior art approaches have taught systems which can provide very low gloss powder coatings, there is a need to provide low gloss powder coatings which also provide resistance to chemical warfare agents.

This invention therefore relates to a low gloss chemical agent resistant powder coating composition comprising:
  (a) a first acrylic powder resin having a hydroxyl value of at least about 180;
  (b) a second acrylic powder resin having a hydroxyl value less than about 45;
  (c) a crosslinker reactive with the hydroxyl functional acrylic resins; and
  (d) wollastonite.

For certain embodiments of this invention it is useful to have the weight ratio of the first acrylic powder resin to the second acrylic powder resin be greater than 1.0.

1. HYDROXY FUNCTIONAL ACRYLIC POWDER RESIN

One aspect of this invention involves the selection of two different hydroxyl functional acrylic powder resins having varying hydroxyl values. The production of acrylic polymers of a given hydroxyl number is well known within the art. The hydroxyl functional acrylic polymers of this invention are obtained in a customary manner, for example, by polymerizing at least one hydroxyl functional monomer, typically a hydroxyl functional (meth)acrylate such as hydroxyethyl or hydroxypropyl (meth)acrylate, along with other copolymerizable unsaturated monomers. Representative copolymerizable monomers include vinyl compounds such as styrene, methylstyrene, vinyl acetate, and the unsaturated alkyl esters of (meth)acrylic acids. Suitable alkyl (meth)acrylate monomers include, for example, methyl (meth)acrylate, ethyl (meth)acrylate, butyl (meth)acrylate, propyl (meth)acrylate, 2-ethyl hexyl (meth)acrylate, cyclohexyl (meth)acrylate, decyl (meth)acrylate, isodecyl (meth)acrylate, benzyl (meth)acrylate, isobornyl (meth)acrylate, neopentyl (meth)acrylate, and 1-adamatyl methacrylate. By selecting the level of hydroxyl functional monomer which is incorporated into the acrylic powder resins, any given hydroxyl value can be selected. The polymers can be formulated to any useful glass transition temperature. For some applications it is useful to have a Tg of at least 35° C., and sometimes at least 40° C. for each of the hydroxy functional acrylic resins. For some applications it is useful to have the resin with the higher hydroxyl number have a Tg of at least 45° C. or higher to provide ever greater resistance to chemical agents.

For this invention, a first hydroxyl functional acrylic powder resin will be produced having a hydroxyl value of at least about 180, and a second hydroxyl functional acrylic polymer resin will be produced having a hydroxyl value less than about 45. These resins are then combined with a suitable crosslinking agent reactive with hydroxyl groups, such as a blocked isocyanate or uretdione, to provide the powder coating composition. For some embodiments of this invention, the first acrylic powder resin will have a hydroxyl value between about 180 and about 250, and for some embodiments of this invention it is useful for the second acrylic powder resin to have a hydroxyl value between about 5 and 45 and for some embodiments between about 20 and 45.

For those applications requiring resistance to chemical agents it is often useful to provide a weight ratio of the first acrylic powder resin to the second acrylic powder resin greater than 1.0. Typically, for the combination of the first acrylic powder resin and the second acrylic powder resin, between about 50.1 weight percent and 85.0 weight percent of the total amount of hydroxy functional acrylic resin would be the first acrylic powder resin. For some applications, between about 50.1 and 60 percent by weight of the combined weight of the first and second acrylic resins would be the first acrylic powder resin.

The powder coatings of this invention can be produced using conventional powder coating production methods, but it has been found that for some applications it is preferred to process the portion comprising the first acrylic powder resin and the portion comprising the second acrylic powder resin separately at first and then combining the separate portions into a final coating.

This process comprises:
  (a) extruding and grinding a first powder composition comprising a crosslinker and a first acrylic powder resin having a hydroxyl value of at least about 180; and
  (b) extruding and grinding a second powder composition comprising a crosslinker and a second acrylic powder resin having a hydroxyl value less than about 45;
  (c) combining the ground, extruded first and second powder compositions to provide a weight ratio of the first acrylic resin to the second acrylic resin greater than 1.0.

Additionally, it has been found that the use of wollastonite as a flattening pigment is useful in meeting the very low gloss and chemical resistance requirements of these coatings. Typically, the wollastonite would be present at a weight solids percent of at least 10 percent and for some embodiments, at least 15 percent, and for some embodiments at least 25 percent of the total weight solids of the coating. For some applications it is useful to use a level of wollastonite between about 10 and 35 percent by weight of the total weight solids of the final powder coating composition comprising the resins, the crosslinker and pigments.

Additional pigments such as titanium dioxide, metallic pigments, iron oxides, carbon black, organic pigments etc. can also be included. The coatings may also contain extender pigments, including polymeric extender pigments provided they are stable at the processing and cure temperatures of the powder coatings.

Additives such as flow agents, degassing agents, antistatic agents, plasticizers, light stabilizers, light absorbers, catalysts etc. can also be added.

The powder coatings of this invention can be prepared by typical means well known in the art such as by first melt blending the ingredients of the coating compositions in an extruder at a suitable temperature. The extrudate is then cooled and pulverized. In one useful process for this invention, the first acrylic powder resin and a suitable crosslinker are extruded and ground or pulverized as one composition and the second acrylic powder resin and a crosslinker are separately extruded and ground or pulverized. These dried materials can then blended into a final coating composition.

The application of the powder coatings can be made by any means well known in the art for powder coatings such as by electrostatic spraying or by the use of a fluidized bed to any suitable substrate. If desired, the substrate can optionally be preheated prior to application of the powder coating composition. Once the coating composition has been applied to the substrate, the coating is cured by heating at a temperature and for a length of time sufficient to cause the reactants to form an insoluble polymer network. Typical cure temperatures would normally range from about 125° C. to about 250° C. for a period of about 10 to about 30 minutes. Suitable substitutes include any substrate which is not adversely affected by the cure time and temperature and would typically include metal, glass and plastic substrates. If desired, the substrate can be pretreated and/or coated with one or more suitable primer coats before application of the coatings of this invention.

The following examples have been selected to illustrate some specific embodiments and practices of advantage to a more complete understanding of the invention. Unless otherwise stated, "parts" means parts-by-weight and "percent" is percent-by-weight, and equivalent weight is on a weight solids basis.

Examples 1-10 in Table 1 were prepared by blending and extruding the listed raw materials. The extrudate was cooled and fractured to produce a powder coating which was then applied to a suitable substrate and baked for 10 minutes at 400° F. and then tested for gloss and other properties. Chemical agent resistance testing results were generally more favorable for coatings having a weight ratio of resin 1/resin 2 greater than 1.0.

Examples 11-13 in Table 1 were prepared by blending and extruding the listed raw materials. The extrudate was cooled and fractured to produce a powder coating which was then applied to a suitable substrate and baked for 10 minutes at 400° F. and then tested for gloss and other properties. As a comparison, the products of Examples 12 and 13 were combined in equal weight amounts, and that powder coating was applied and tested in the same manner. That example produced a 60/85 gloss of only 0.5/5.0.

TABLE 2

| RAW MATERIAL | EX #11 | EX #12 | EX #13 |
|---|---|---|---|
| Hydroxy functional acrylic7 | 208.0 | 320.0 | |
| Hydroxy functional acrylic8 | 208 | | 552.5 |
| Blocked isocyanate9 | 234 | 315 | 82.5 |
| Flow agent10 | 10.0 | 10.0 | 10.0 |
| Benzoin | 5.0 | 5.0 | 5.0 |
| Wollastonite11 | 185 | 210 | 210.0 |
| Cobalt chromic green pigment | 62.7 | 62.7 | 62.7 |
| Chrome oxide green pigment | 81.0 | 81.0 | 81.0 |
| Iron oxide red pigment[12] | 6.3 | 6.3 | 6.3 |
| Gloss 60/85 | 11.8/21.6 | 10.6/45.4 | 51.3/84.4 |

[7] Acrylic powder resin having a hydroxyl number of 200, an eq. wt of 280 and a Tg of about 63° C.
[8] Acrylic powder resin having a hydroxyl number of 30, an eq. wt. of 1870, a specific gravity of 1.11, a Tg of about 50° C. and a softening point of 112° C.
[9] Vestagon ™ B 1530 e-caprolactam blocked IPD1 commercially available from Degussa
[10] Resiflow ™ PL-200 acrylic flow agent commercially available from Estron Chemicals
[11] Nyglos ™ 4W commercially available from Nyco Minerals
[12] In Examples 12 and 13 the iron oxide red pigment was added as 63 gross of a 10% solids slurry.

While this invention has been described by a specific number of embodiments, other variations and modifications may be made without departing from the spirit and scope of the invention as set forth in the appended claims.

I claim:
1. A process for producing a low gloss powder coating which process comprises:

TABLE 1

| RAW MATERIAL | EX. #1 | EX. #2 | EX. #3 | EX. #4 | EX. #5 | EX. #6 | EX. #7 | EX. #8 | EX. #9 | EX. #10 |
|---|---|---|---|---|---|---|---|---|---|---|
| Hydroxy functional acrylic1 | 237.0 | 220.0 | 214.0 | 208.0 | 202.0 | 196.0 | 176.0 | 214.0 | 208.0 | 202.0 |
| Hydroxy functional acrylic2 | 158.0 | 188.0 | 198.0 | 208.0 | 218.0 | 230.0 | 264.0 | 198.0 | 208.0 | 218.0 |
| Blocked iscyanate3 | 256.0 | 203.0 | 239.0 | 234.0 | 231.0 | 226.0 | 211.0 | 239.0 | 234.0 | 231.0 |
| Flow agent4 | 10.0 | 10.0 | 10.0 | 10.0 | 10.0 | 10.0 | 10.0 | 10.0 | 10.0 | 10.0 |
| Benzoin | 5.0 | 5.0 | 5.0 | 5.0 | 5.0 | 5.0 | 5.0 | 5.0 | 5.0 | 5.0 |
| Wollastonite5 | 184.0 | 184.0 | 184.0 | 185.0 | 184.0 | 183.0 | 184.0 | 174.0 | 175.0 | 174.0 |
| Polymeric extender6 | | | | | | | | 10.0 | 10.0 | 10.0 |
| Cobalt chromic green pigment | 62.7 | 62.7 | 62.7 | 62.7 | 62.7 | 62.7 | 62.7 | 62.7 | 62.7 | 62.7 |
| Chrome oxide green pigment | 81.0 | 81.0 | 81.0 | 81.0 | 81.0 | 81.0 | 81.0 | 81.0 | 81.0 | 81.0 |
| Iron oxide red pigment | 6.3 | 6.3 | 6.3 | 6.3 | 6.3 | 6.3 | 6.3 | 6.3 | 6.3 | 6.3 |
| Gloss 60/85 | 2.2/6.7 | 0.7/4.6 | 0.7/5.5. | 0.6/5.0 | 0.5/5.8 | 5/5.1 | 0.5/5.5 | | | |

[1] Isocryl ™ H-280 commercially available acrylic powder resin from Estron Chemicals having a hydroxyl number of 200, an eq. wt. of 280, a specific gravity of 1.14, a Tg of about 42° C. and a softening point of 105° C.
[2] Acrylic powder resin having a hydroxyl number of 30, an eq. wt. of 1870, a specific gravity of 1.11, is Tg of about 50° C. and a softening point of 112° C.
[3] Vestagon ™ B 1530 e-caprolactam blocked IPD1 commercially available from Degussa
[4] Resiflow ™ PL-200 acrylic flow agent commercially available from Estron Chemicals
[5] Nyglos ™ 4W commercially available from Nyco Minerals
[6] Pergopak ™ M4 urea formaldehyde beads commercially available from Albemarle Corp.

(a) extruding and grinding a first powder composition to form an extruded and ground first powder composition comprising a crosslinker and a first acrylic powder resin having a hydroxyl value of at least about 180; and
(b) extruding and grinding second powder composition to form an extruded and ground second powder composition comprising a crosslinker and a second acrylic powder resin having a hydroxyl value less than about 45; and
(c) combining the extruded and ground a first powder composition and the extruded and ground second powder composition to provide a weight ratio of the first acrylic resin to the second acrylic resin greater than 1.0.

2. The process of claim 1 wherein at least one of the first powder composition or the second powder composition comprises wollastonite.

* * * * *